(12) United States Patent
Zhang et al.

(10) Patent No.: US 10,372,250 B2
(45) Date of Patent: Aug. 6, 2019

(54) TACTILE FEEDBACK DEVICE, RELATED METHOD, AND TOUCH DISPLAY DEVICE CONTAINING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventors: Bin Zhang, Beijing (CN); Qiang Zhang, Beijing (CN); Guangxing Wang, Beijing (CN); Kan Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/533,862

(22) PCT Filed: Dec. 27, 2016

(86) PCT No.: PCT/CN2016/112243
§ 371 (c)(1),
(2) Date: Jun. 7, 2017

(87) PCT Pub. No.: WO2017/128909
PCT Pub. Date: Aug. 3, 2017

(65) Prior Publication Data
US 2018/0052550 A1 Feb. 22, 2018

(30) Foreign Application Priority Data
Jan. 25, 2016 (CN) .......................... 2016 1 0048671

(51) Int. Cl.
*G06F 3/041* (2006.01)
*G06F 3/01* (2006.01)

(52) U.S. Cl.
CPC ............ *G06F 3/0412* (2013.01); *G06F 3/016* (2013.01); *G06F 3/041* (2013.01); *G09G 2310/0264* (2013.01)

(58) Field of Classification Search
None
See application file for complete search history.

(56) References Cited

U.S. PATENT DOCUMENTS

2003/0076298 A1* 4/2003 Rosenberg ............. G06F 3/016
345/156
2008/0150911 A1 6/2008 Harrison
(Continued)

FOREIGN PATENT DOCUMENTS

CN 101907922 A 12/2010
CN 101933010 A 12/2010
(Continued)

OTHER PUBLICATIONS

The World Intellectual Property Organization (WIPO) International Search Report for PCT/CN2016/112243 dated Mar. 29, 2017.
(Continued)

*Primary Examiner* — Kenneth B Lee, Jr.
(74) *Attorney, Agent, or Firm* — Westerman, Hattori, Daniels & Adrian, LLP

(57) ABSTRACT

The present disclosure provides a tactile feedback device, including: a deformable structure, a driver coupled to the deformable structure, and a controller coupled to the driver. The deformable structure is configured to include a plurality of deformable units placed on a display panel, each of the plurality of deformable units being capable of deforming along a direction at an angle to a plane the plurality of deformable units is placed on. The controller is configured to generate and send a control signal to the driver, the control signal being based on a touch location of a touch motion. The driver is configured to drive deformable units corre-
(Continued)

sponding to the touch location to deform based on the control signal.

13 Claims, 5 Drawing Sheets

(56) References Cited

U.S. PATENT DOCUMENTS

| | | |
|---|---|---|
| 2009/0085879 A1 | 4/2009 | Dai et al. |
| 2011/0261021 A1 | 10/2011 | Modarres et al. |
| 2011/0316798 A1 | 12/2011 | Jackson et al. |
| 2012/0062516 A1 | 3/2012 | Chen et al. |

FOREIGN PATENT DOCUMENTS

| | | | |
|---|---|---|---|
| CN | 102236463 | A | 11/2011 |
| CN | 102844726 | A | 12/2012 |
| CN | 105204687 | A | 12/2015 |
| CN | 205318349 | U | 6/2016 |
| CN | 105739762 | A | 7/2016 |

OTHER PUBLICATIONS

State Intellectual Property Office of the P.R.C (SIPO) Office Action 1 for 201610048671.4 dated Jan. 26, 2018 28 Pages (including translation).
Office Action dated Dec. 3, 2018, issued in counterpart to Chinese Application No. 201610048671.4, with English translation (24 pages).

\* cited by examiner

TACTILE FEEDBACK DEVICE, RELATED METHOD, AND TOUCH DISPLAY DEVICE CONTAINING THE SAME

CROSS-REFERENCES TO RELATED APPLICATIONS

This application is a national phase entry under 35 U.S.C. § 371 of International Application No. PCT/CN2016/112243, filed on Dec. 27, 2016, which claims priority to Chinese Patent Application No. 201610048671.4, filed on Jan. 25, 2016, the entire contents of both of which are incorporated by reference herein.

TECHNICAL FIELD

The present invention generally relates to the display technologies and, more particularly, relates to a tactile feedback device, a method for generating tactile feedback in response to a touch motion using the tactile feedback device, and a touch display device containing the tactile feedback device.

BACKGROUND

As the display technology advances, touch screens have been widely used in smart phones, tablet computers, all-in-one personal computers, control terminals, etc. However, conventional touch technology lacks interactive experience, resulting in impaired user experience.

BRIEF SUMMARY

The present disclosure provides a tactile feedback device, a touch display device including the tactile feedback device, and a method for generating tactile feedback in response to a touch motion using a tactile feedback device. The disclosed device and method may improve interactive touch experience.

One aspect of the present disclosure includes a tactile feedback device, including: a deformable structure, a driver coupled to the deformable structure, and a controller coupled to the driver. The deformable structure is configured to include a plurality of deformable units placed on a display panel, each of the plurality of deformable units being capable of deforming along a direction at an angle to a plane the plurality of deformable units is placed on. The controller is configured to generate and send a control signal to the driver, the control signal being based on a touch location of a touch motion. The driver is configured to drive deformable units corresponding to the touch location to deform based on the control signal.

Optionally, the driver drives the deformable units corresponding to the touch location to deform along a direction perpendicular to the plane the plurality of deformable units is place on.

Optionally, the plurality of deformable units is arranged in an array.

Optionally, each of the plurality of deformable units includes a first electrode, a second electrode, and a piece of electrostrictive material between the first electrode and the second electrode; and when the driver applied a voltage signal between the first electrode and the second electrode, the piece of electrostrictive material deforms in response to the voltage signal.

Optionally, the tactile feedback device further includes a first signal line, a second signal line, and a thin-film transistor being coupled to a deformable unit. The first signal line is coupled to a source electrode of the first thin-film transistor, the second signal line is coupled to a gate electrode of the first thin-film transistor, a first electrode of the deformable unit is coupled to a drain electrode of the thin-film transistor, and a second electrode of a deformable unit is grounded. When the second signal line coupled to the thin-film transistor is applied with a voltage scanning signal, and the first signal line coupled to the thin-film transistor is applied with a voltage driving signal, the deformable unit deforms.

Optionally, the driver includes a voltage driving module, a voltage scanning module, and a multiplexer; the voltage driving module is configured to generate the voltage driving signal; the voltage scanning module is configured to generate the voltage scanning signal; and base on the control signal, the multiplexer is configured to input the voltage scanning signal to the second signal line, and input the voltage driving signal to the corresponding first signal line, to drive the deformable unit to deform.

Optionally, the multiplexer includes a second thin-film transistor and a third thin-film transistor, the second thin-film transistor corresponding to the first signal line and the third thin-film transistor corresponding to the second signal line; a source electrode of the second thin-film transistor is coupled to an output terminal of the voltage driving module, and a drain electrode of the second thin-film transistor is coupled to the first signal line; and a source electrode of a third thin-film transistor is coupled to an output terminal of the voltage scanning module, and a drain electrode of the third thin-film transistor is coupled to the second signal line.

Optionally, the voltage driving signal is an alternating current (AC) voltage signal.

Optionally, the piece of electrostrictive material includes piezoelectric ceramic.

Another aspect of the present disclosure provides a touch display device, incorporating the disclosed tactile feedback device.

Optionally, the touch display panel further includes a touch screen and a display panel. The touch screen is disposed at a side of the display panel that is used for displaying images. The tactile feedback device is disposed at a side of the touch screen that faces away from the display panel, the controller of the tactile feedback devices being configured to obtain touch location data from the touch screen.

Another aspect of the present disclosure provides a method for generating tactile feedback in response to a touch motion using a tactile feedback device, including: obtaining, by a controller, a touch location of a touch motion; sending, by the controller, a control signal to a driver of the tactile feedback device based on the touch location; and applying, by the driver, a voltage signal on a deformable unit based on the control signal, the deformable unit deforming in response to the voltage signal.

Optionally, the deformable unit includes a first electrode, a second electrode, and a piece of electrostrictive material between the first electrode and the second electrode; and when the driver applies a voltage signal across the first electrode and the second electrode, the piece of electrostrictive material deforms in response to the voltage signal.

Optionally, the voltage signal includes an alternating current (AC) voltage signal.

Optionally, the driver drives deformable units corresponding to the touch location to deform along a direction perpendicular to the plane the plurality of deformable units is place on.

Optionally, the method further includes a first signal line, a second signal line, and a thin-film transistor being coupled to a deformable unit. The first signal line is coupled to a source electrode of the first thin-film transistor, the second signal line is coupled to a gate electrode of the first thin-film transistor, a first electrode of the deformable unit is coupled to a drain electrode of the thin-film transistor, and a second electrode of a deformable unit is grounded. When the second signal line coupled to the thin-film transistor is applied with a voltage scanning signal, and the first signal line coupled to the thin-film transistor is applied with a voltage driving signal, the deformable unit deforms.

Optionally, the driver includes a voltage driving module, a voltage scanning module, and a multiplexer; the voltage driving module is configured to generate the voltage driving signal; the voltage scanning module is configured to generate the voltage scanning signal; and base on the control signal, the multiplexer is configured to input the voltage scanning signal to the second signal line, and input the voltage driving signal to the corresponding first signal line, to drive the deformable unit to deform.

Optionally, the multiplexer includes a second thin-film transistor and a third thin-film transistor, the second thin-film transistor corresponding to the first signal line and the third thin-film transistor corresponding to the second signal line; a source electrode of the second thin-film transistor is coupled to an output terminal of the voltage driving module, and a drain electrode of the second thin-film transistor is coupled to the first signal line; and a source electrode of a third thin-film transistor is coupled to an output terminal of the voltage scanning module, and a drain electrode of the third thin-film transistor is coupled to the second signal line.

Optionally, the piece of electrostrictive material includes piezoelectric ceramic.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

Embodiments of the present disclosure provides a tactile feedback device that can be integrated with touch screens. In some embodiments, a semiconductor device may include a touch screen display panel with the tactile feedback device. The tactile feedback device may include a plurality of deformable units. When the user touches the touch screen of the display panel, the tactile feedback device may detect the touch location information of the touch motion through the touch screen. Based on the detected touch location information, the tactile feedback device may apply a voltage driving signal on one or more deformable units at the touch location such that the deformable units may deform. Accordingly, the touch screen may respond or generate feedback to the touch motion by presenting deformations at the touch location. The user may sense the deformation or unevenness at the touch location. Embodiments of the present disclosure thus improve the user experience when interacting with the touch sensing screens.

One aspect of the present disclosure provides a tactile feedback device.

Figure 1:
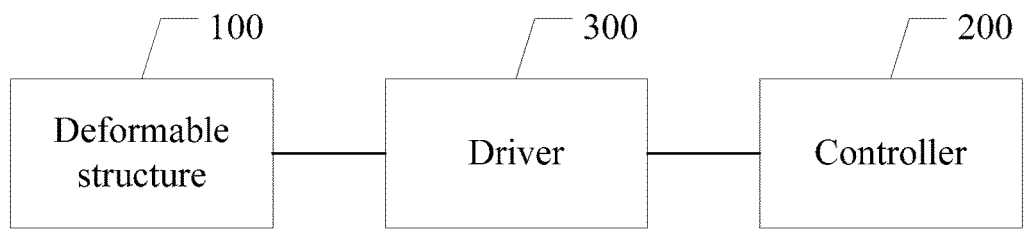
FIG. 1 illustrates a block diagram of an exemplary tactile feedback device according to various disclosed embodiments of the present disclosure.

FIG. 1 illustrates the block diagram of an exemplary tactile feedback device. The tactile feedback device may include a deformable structure 100, a controller 200, and a driver 300. The deformable structure 100 may include a plurality of deformable units. The controller 200 may send a control signal to the driver 300 based on the touch location information, i.e., information on the location of a touch motion. The driver 300 may be coupled to the deformable structure 100 and the controller 200. Based on the control signals sent by the controller 200, the driver 300 may drive the deformable units that correspond to the touch location information to deform. The deformable units that correspond to the touch location information may be located at the touch location. When a user touches the touch screen, one or more deformable units may be touched. In the present disclosure, the term "coupled to" may refer to any suitable types of coupling and/or connections, e.g., electrical connection or mechanical connection. In various embodiments, the term "coupled to" may be interchangeable with the term "connected to".

When a user touches the touch screen of the disclosed tactile feedback device, the controller 200 may send a control signal to the driver based on the touch location. After receiving the control signal, the driver may control the deformable units, located at the touch location, to deform. The tactile feedback device may thus generate feedback in response to the user's touch motion. Interactive touch experience may be effectively improved.

Figure 2:
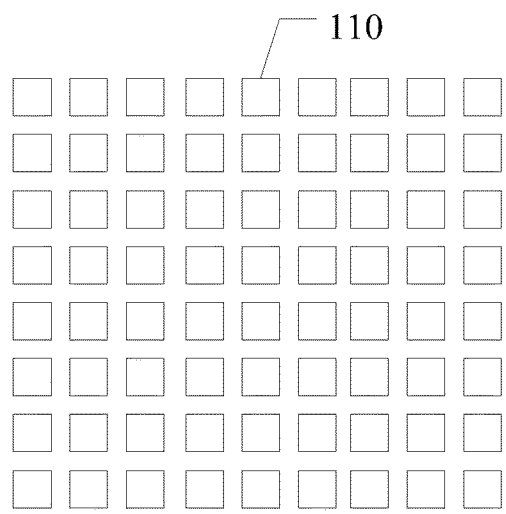
FIG. 2 illustrates an exemplary arrangement of deformable units according to various disclosed embodiments of the present disclosure.

The deformable structure 100 may include a plurality of deformable units. For example, the plurality of deformable units 110 of the deformable structure 100 may be arranged in an array, shown in FIG. 2. When the tactile feedback device detects a touch motion, the tactile feedback device may control the deformable units 110 at the touch location to deform, and provide feedback to the user accordingly. It should be noted that, the pattern the deformable units 110 are arranged should not be limited by the embodiments disclosed in the present disclosure. In certain other embodiments, the deformable units 110 may also be arranged in other patterns other than an array. The specific arrangement of the deformable units 110 should be determined or adjusted according to different applications and designs.

When the disclosed tactile feedback device detects a touch motion, the controller 200 of the tactile feedback device may apply a voltage driving signal on the deformable units at the touch location through the driver. The deformable units may deform in response to the voltage driving signal. For example, the deformable units may be made of a desired material with electromechanical properties, e.g., an electrostrictive material. The deformable units may thus undergo certain deformation under an external electric field. The amount of deformation on a deformable unit may be proportional to the square of the intensity of the electric field.

Figure 3:
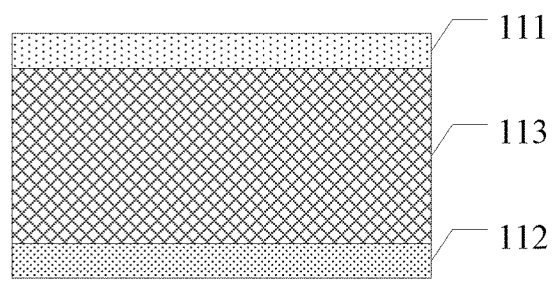
FIG. 3 illustrates an exemplary deformable unit according to various disclosed embodiments of the present disclosure.

For example, the structure of a deformable unit may be illustrated in FIG. 3. The deformable unit may include a first electrode 111, a second electrode 112, and an electrostrictive structure 113 between the first electrode 111 and the second electrode 112. In one embodiment, the electrostrictive structure 113 may be made of piezoelectric ceramic. The electrostrictive structure 113 may have a bar shape along the direction perpendicular to the touch screen or perpendicular to the plane the array of deformable units is arranged. The cross-sectional view of a deformable unit may be rectangular, as shown in FIG. 3. When a voltage is applied between the first electrode 111 and the second electrode 112, the deformable unit may undergo a deformation in response to the electric field between the first electrode 111 and the second electrode 112. The deformation may be the feedback to the touch motion. For example, for the deformable unit shown in FIG. 3, the second electrode 112 may be grounded, and the driver may apply the voltage on the first electrode 111 to control the deformable unit. It should be noted that, in various embodiments of the present disclosure, the electrostrictive structure 113 may also deform along other suitable angles, e.g., not equal to 90° with respect to the plane the array of deformable units is arranged. The plane may refer to the surface of the plane. The value of the angle may be determined according to different applications and designs and should not be limited by the embodiments of the present disclosure.

In some embodiments, the driver may generate an alternating current (AC) voltage signal based on the control signal to drive the deformable units to deform. For example, for the deformable unit shown in FIG. 3, the second electrode 112 may be grounded. When an AC voltage signal is applied on the first electrode 111, the shape or length of the electrostrictive structure may change in the direction perpendicular to the touch screen. The AC voltage signal may have a sufficiently high frequency that the user, touching the touch screen of the tactile feedback device, may sense or experience the vibration and unevenness on the touch screen. Thus the interactive touch experience may be improved.

Figure 4:
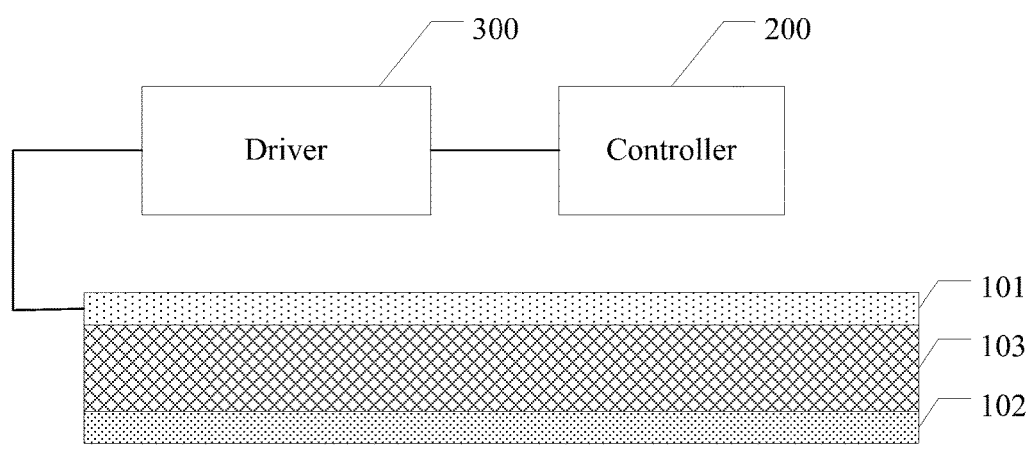
FIG. 4 illustrates a block diagram of another exemplary tactile feedback device according to various disclosed embodiments of the present disclosure.

FIG. 4 illustrates another exemplary structure of the tactile feedback device provided by the present disclosure. The tactile feedback structure may include a deformable structure 100, a controller 200, and a driver 300.

The deformable structure 100 may include a first electrode layer 101, a second electrode layer 102, and an electrostrictive layer 103 positioned between the first electrode layer 101 and the second electrode layer 102. The electrostrictive layer 103 may be made of a suitable electrostrictive material. The first electrode layer 101 may include the first electrodes 111 of a plurality of deformable units 110. The second electrode layer 102 may include the second electrodes 112 of the plurality of deformable units 110. The electrostrictive layer 103 may include the electrostrictive structures of the plurality of deformable units 110.

Figure 5:
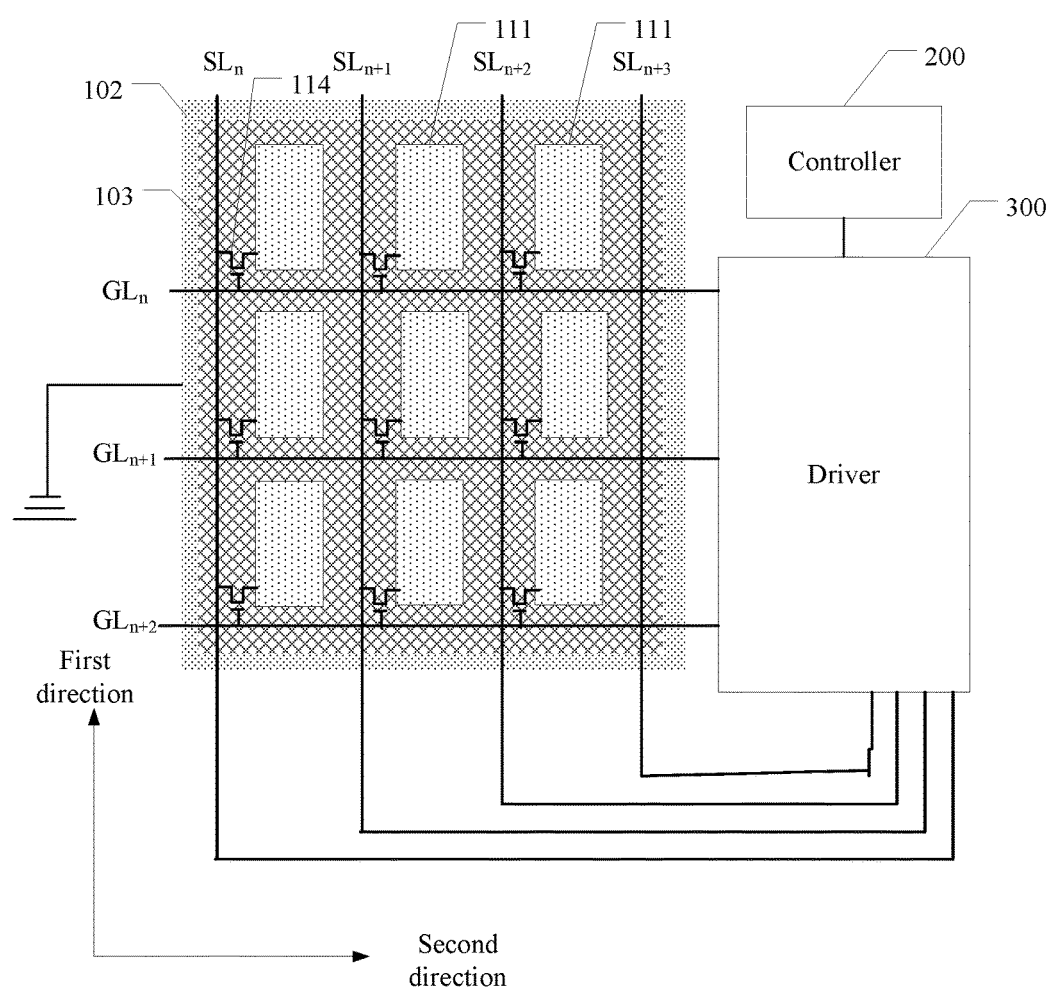
FIG. 5 illustrates a structure of another exemplary tactile feedback device according to various disclosed embodiments of the present disclosure.

The tactile feedback device shown in FIG. 4 may be controlled through a plurality of signal lines. For example, the tactile feedback device shown in FIG. 4 may have a layout illustrated in FIG. 5. As shown in FIG. 5, the plurality of first electrodes 111 in the first electrode layer 101 may be separated from each other and arranged in an array. A plurality of first signal lines, e.g., $SL_n$, $SL_{n+1}$, $SL_{n+2}$, $SL_{n+3}$, may be arranged along a first direction. A plurality of second signal lines, e.g., $GL_n$, $GL_{n+1}$, $GL_{n+2}$, may be arranged along a second direction. Each deformable unit may correspond to or be coupled to a first thin-film transistor (TFT) 114. The TFTs 114 may be coupled to the deformable units according to a one-to-one correspondence. The first direction may be different from the second direction. In one embodiment, the first direction and the second direction may be perpendicular to each other.

A first signal line may be coupled to the source electrodes of a plurality of first TFTs 114 corresponding to a column of deformable units. A second signal line may be coupled to the gate electrodes of a plurality of first TFTs 114 corresponding to a row of deformable units. The first electrode 111 of a deformable unit 110 may be coupled to the drain electrode of the corresponding TFT 114. The second electrode 112 of a deformable unit 110 may be grounded.

When a second signal line, coupled to the gate electrode of a first TFT 114, is applied with a voltage scanning signal, and a corresponding first signal line, coupled to the source electrode of the first TFT 114, is applied with a voltage driving signal, the deformable unit corresponding to the TFT 114 may undergo deformation.

Further, a plurality of the electrostrictive structures in the electrostrictive layer 103 may be connected as one piece. That is, the electrostrictive layer 103 may be a whole layer or a whole piece of electrostrictive film. Also, the plurality of the electrostrictive structures may be separately arranged. For example, the electrostrictive structures may be separately arranged in a same array pattern as the first electrodes 111 in the first electrode layer 101. Similarly, a plurality of second electrodes in the second electrode layer 102 may be connected as one piece. That is, the second electrode layer 102 may be a whole layer or a whole piece of an electrically conductive film. Further, the plurality of the second electrodes 112 may be separately arranged. For example, the second electrodes 112 may be separately arranged in a same array pattern as the first electrodes 111 in the first electrode layer 101. In one embodiment, the first electrode layer 101 and the second electrode layer 102 may be made of a transparent conductive material, such as indium tin oxide (ITO). The number and dimensions of the deformable units 110 may be determined or adjusted according to the dimensions of the touch screen/display panel.

The controller 200 may send control signals to the driver 300 based on the touch location information when a user touches the touch screen of the tactile feedback device.

The driver 300 may drive the deformable units 110 in the deformable layer 103 to undergo deformation based on the control signal sent by the controller 200. The deformable units 110 that undergo deformation may correspond to the touch location information sent by the controller 200. For example, the deformable units 110 that undergo deformation may be at the touch location.

Specifically, when the controller of the disclosed tactile feedback device detects the touch location information, the controller may send a control signal to the driver based on the touch location information. The control signal may contain the location information, e.g., coordinates, of the deformable unit that corresponds to the touch location. After receiving the control signal, the driver may apply a voltage scanning signal on the second signal line coupled to the deformable unit 110 so that the first TFTs corresponding to the deformable unit 110 may be turned on. Meanwhile, the driver may apply a voltage driving signal on the first signal line coupled to the deformable unit 110 to change the potential of the first electrode 111. A voltage may be formed between the first electrode 111 and the second electrode 112. The voltage may drive the deformable unit 110, i.e., the electrostrictive structure between the first electrode 111 and the second electrode 112, to undergo deformation. When the user touches more than one deformable units 110, the controller may control the driver to sequentially scan the deformable units 110 corresponding to the touch location. The driver may sequentially drive the deformable units 110 corresponding to the touch location to undergo deformation.

Figure 6:
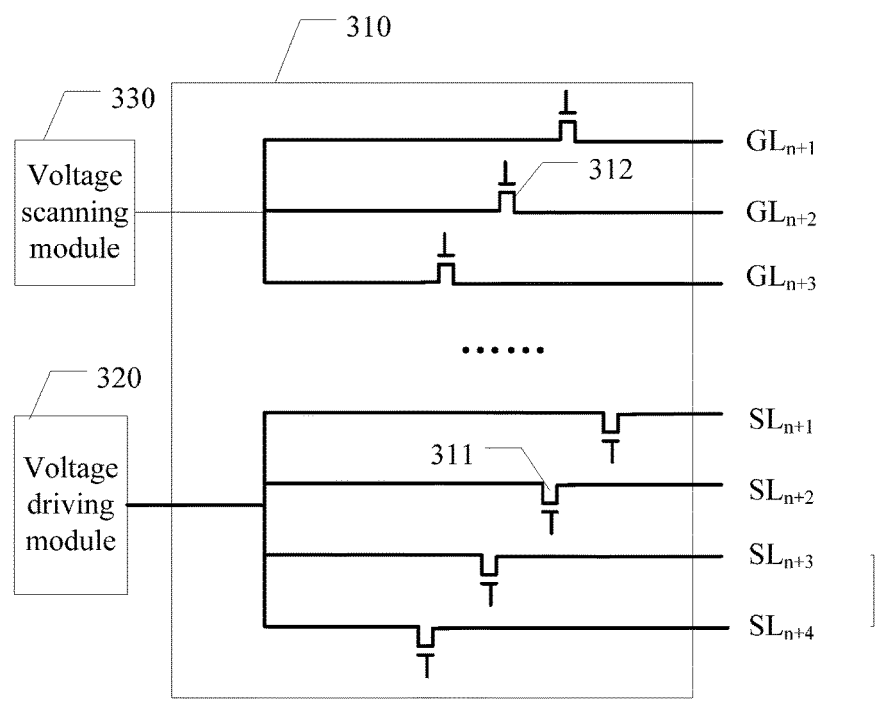
FIG. 6 illustrates an exemplary driver according to various disclosed embodiments of the present disclosure.

For example, the driver 300 may have a structure shown in FIG. 6. The driver 300 may include a multiplexer 310, a voltage driving module 320, and a voltage scanning module 330. The voltage driving module 320 may be configured to generate the voltage driving signals. The voltage scanning modules 330 may be configured to generate the voltage scanning signals. The modules described in the present disclosure, e.g., the voltage driving module 320 and the voltage scanning module 330, may include any suitable software and/or hardware capable for implementing the functions of the modules. For example, the voltage driving module 320 and the voltage scanning module 330 may include suitable circuits for driving the TFTs and scanning voltages, respectively.

The multiplexer 310 may input a voltage scanning signal into the second signal line based on the control signal. Meanwhile, the multiplexer 310 may input the voltage driving signal into the first signal line that correspond to the second signal line. The voltage driving signals may drive the deformable units that correspond to the touch location information to undergo deformation. The first signal line and a corresponding second signal line may be coupled to a same first TFT.

Further, as shown in FIG. 6, the multiplexer 310 may include a plurality of second TFTs 311 and a plurality of third TFTs 312. A second TFT 311 may correspond to a first signal line and a third TFT 312 may correspond to a second signal line. For example, the source electrode of a second TFT 311 may be coupled to the output terminal of the voltage driving module 320, and the drain electrode of the second TFT 311 may be coupled to a first signal line. The source electrode of a third TFT 312 may be coupled to the output terminal of the voltage scanning module 330, and the drain electrode of the third TFT 312 may be coupled to a second signal line.

For the driver shown in FIG. 6, when receiving the control signal sent by the controller, the driver may turn on desired second TFTs and third TFTs. Thus, the driver may write or input the voltage driving signal generated by the voltage driving module 320 into the first signal lines (e.g., $SL_{n+1}$, $SL_{n+2}$, and so on) through the turned-on second TFTs 311, and may write the voltage scanning signal generated by the voltage scanning module 330 into the second signal lines (e.g., $GL_{n+1}$, $GL_{n+2}$, and so on) through the turned-on third TFTs 312. The voltage driving signal and the voltage scanning signal may select the deformable units 110 at the touch location and control the deformable units 110 to undergo deformation.

Further, to control the multiplexer 310, in some embodiments, the multiplexer may further include a fourth TFT (not shown). For example, the source electrode of the fourth TFT may be coupled to the output terminals of the voltage driving module 320 and the voltage scanning module 330, and the drain electrode of the fourth TFT may be coupled to the source electrode of each second TFT 311 and the source electrode of each third TFT 312. When the fourth TFT, and the second TFTs 311 and the third TFTs 312 corresponding to the deformable units at the touch location are turned on, the deformable units at the touch location may undergo deformation.

In one embodiment, the second TFTs 311, the third TFTs 312, and the fourth TFT may function as switches. It should be noted that, other suitable switching devices may also be used in the multiplexer 310 to implement the functions of the TFTs.

Another aspect of the present disclosure provides a touch display device. The touch display device may incorporate the disclosed tactile feedback device.

In some embodiments, the touch display device may include a touch screen and a display panel. The touch screen may incorporate the disclosed tactile feedback device. The controller of the disclosed tactile feedback device may detect the touch location information of a touch motion through the touch screen. The touch screen may be disposed on the side of the display panel that is used for displaying images. The deformable units may be disposed on the side of the touch screen facing away from the display panel.

Another aspect of the present disclosure provides a semiconductor device. The semiconductor device may incorporate one or more of the disclosed touch display devices. The semiconductor device may be a display screen of a laptop computer, a monitor, a television, a digital frame, a mobile phone, a tablet computer, or any other parts of products with display functions.

Figure 7:
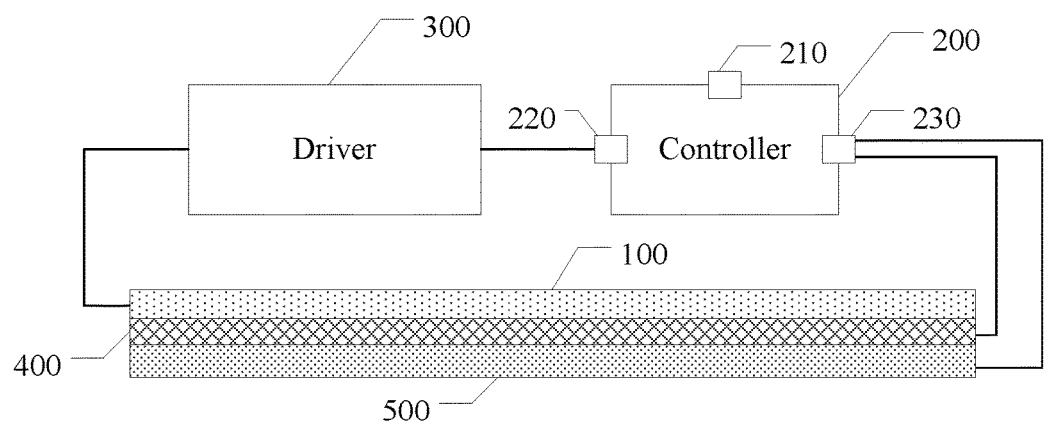
FIG. 7 illustrates an exemplary semiconductor device according to various disclosed embodiments of the present disclosure.

FIG. 7 illustrates the structure of an exemplary semiconductor device provided by the present disclosure. The semiconductor device may include the disclosed tactile feedback device and a touch liquid crystal display module (TLCM) structure. The TLCM structure may include a touch screen 400 and a display panel 500. The deformable structure 100 of the tactile feedback device, the touch screen 400, and the display panel 500 may be stacked together, as shown in FIG. 7. The touch screen 400 may be arranged on the side of the display panel 500 that is used for displaying images. The deformable structure 100 may be arranged on the side of the touch screen 400 that is facing away from the display panel 500. In some embodiments, the semiconductor device may be a touch display device.

When the user touches the semiconductor device, the controller 200 of the tactile feedback device may detect the touch location information of the touch motion through the touch screen 400, and the controller 200 may send a control signal to the driver 300 based on the detected touch location information. After receiving the control signal, the driver may apply a voltage driving signal on the deformable unit at the touch location such that the deformable unit may undergo deformation. Thus, the semiconductor device may respond or generate feedback to the touch motion accordingly. For example, the touch display panel may perform certain functions, depending on the location of the touch motion, the duration of the touch motion, etc. The user may also sense the deformation or unevenness at the touch location. That is, the touch display panel may send feedback to the user's touch motion.

Further, when the deformable units 110 contain electrostrictive material, the voltage signal applied on the deformable units 110 by the driver 300 may be an AC voltage signal. When a deformable unit 110, containing a suitable electrostrictive material, is applied with a suitable AC voltage signal, the length of the deformable unit 110 along the direction perpendicular to the display panel or touch screen may be changed, e.g., undergoing subtle changes. Because the frequency of the AC voltage signal is sufficiently high, the user may sense vibration and unevenness on the touch screen. The interactive touch experience may thus be improved. Augmented reality (AR) effect may be enhanced.

In some embodiments, the controller 200 may integrate touch control and display control of the semiconductor device. For example, as shown in FIG. 7, the controller 200 may include a first interface 210 for receiving video signals, a second interface 220 for connecting the driver 300, and a third interface 230 for connecting the display panel 400 and the display panel 500. The controller 200 may control the images displayed by the display panel 500 based on the video signals received by the first interface 210. For example, the controller 200 and the driver 300 may be arranged on a printed circuit board (PCB).

Another aspect of the present disclosure provides a method for generating tactile feedback in response to a touch motion.

According to the method, the controller of a tactile feedback device may obtain the touch location information of a touch motion. The controller may send control signals to the driver based on the touch location information. Further, the driver may drive the deformable units corresponding to the touch location information to undergo deformation based on the control signals sent by the controller.

In some embodiments, a deformable unit may include a first electrode, a second electrode, and a piece of electrostrictive material disposed between the first electrode and the second electrode. When a voltage is applied between the first electrode and the second electrode, the deformable unit may undergo deformation.

In some embodiments, based on the control signals sent by the controller, the driver may generate AC voltage signals to drive the deformable units to deform.

It should be noted that, electrostrictive material is only exemplary for illustrating the working principles of the disclosed tactile feedback device. In other various embodiments, a deformable unit may also contain other suitable materials capable of providing feedback in response to touch motions. For example, a deformable unit may also contain a material with a suitable coefficient of thermal expansion. When a use touches the touch screen, the temperature of the touch location may change, e.g., increase, and the volume or shape of the deformable unit along the direction perpendicular to the touch screen may change accordingly. The user may thus sense the roughness on the touch screen. The specific materials used in a deformable unit should not be limited by the embodiments of the present disclosure.

Figure 8:
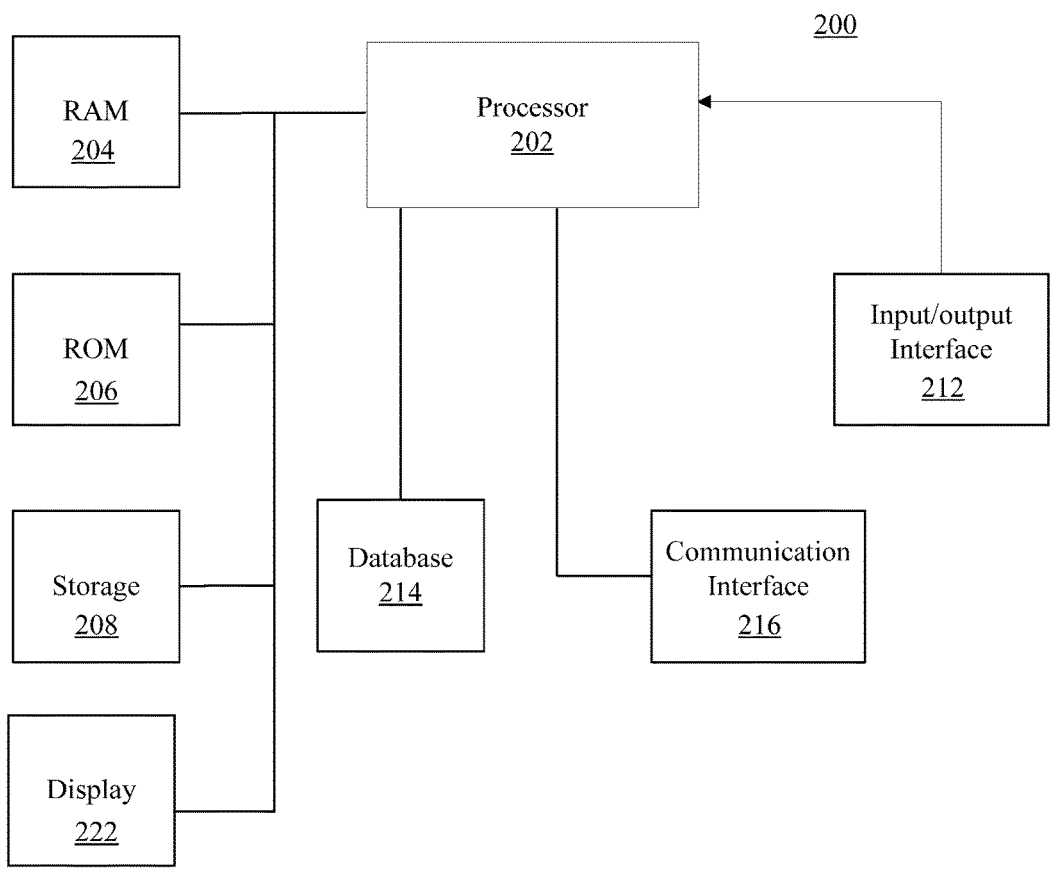
FIG. 8 illustrates a block diagram of the controller used in various embodiments of the present disclosure.

FIG. 8 illustrates the block diagram of the controller 200 used in various embodiments of the present disclosure. The controller 200 may receive, process, and execute commands from the tactile feedback device. The controller 200 may include any appropriately configured computer system. As shown in FIG. 8, the controller 200 may include a processor 202, a random access memory (RAM) 204, a read-only memory (ROM) 206, a storage 208, a display 222, an input/output interface 212, a database 214; and a communication interface 216. Other components may be added and certain devices may be removed without departing from the principles of the disclosed embodiments.

Processor 202 may include any appropriate type of general purpose microprocessor, digital signal processor or microcontroller, and application specific integrated circuit (ASIC). Processor 202 may execute sequences of computer program instructions to perform various processes associated with controller 200. Computer program instructions may be loaded into RAM 204 for execution by processor 202 from read-only memory 206, or from storage 208. Storage 208 may include any appropriate types of mass storage provided to store any types of information that processor 202 may need to perform the processes. For example, storage 208 may include one or more hard disk devices, optical disk devices, flash disks, or other storage devices to provide storage space.

Display 222 may provide information to a user or users of the controller 200. Display 222 may include any appropriate type of computer display device or electronic device display (e.g., CRT or LCD based devices). Input/output interface 212 may be provided for users to input information into controller 200 or for the users to receive information from controller 200. For example, input/output interface 212 may include any appropriate input device, such as a keyboard, a mouse, an electronic tablet, voice communication devices, touch screens, or any other optical or wireless input devices. Further, input/output interface 212 may receive from and/or send to other external devices.

Further, database 214 may include any types of commercial or customized database, and may also include analysis tools for analyzing the information in the databases. Database 214 may be used for storing information for generating feedbacks to the touch motions. Communication interface 216 may provide communication connections such that the controller 200 may be accessed remotely and/or communicate with other systems through computer networks or other communication networks via various communication protocols, such as transmission control protocol/internet protocol (TCP/IP), hyper text transfer protocol (HTTP), etc.

In one embodiment, a user may input commands on the input/output interface 212 to start generating feedbacks in response to the touch motions. The processor 202 may receive, process, and execute the commands to obtain touch location information from the touch screen. The communication interface 216 may communicate with the touch screen to obtain touch location information, e.g., coordinates of the touch location, for the controller 200. Suitable data may be stored in ROM 206 and storage 208 to be processed. After the data is processed, the deformable units at the touch location can be obtained, and the controller 200 may send a control signal to the driver through the communication interface 216. Based on the control signal, the driver may control the deformable units at the touch location to deform. The result can be returned to the user via the display 222 or the input/output interface 212.

The disclosed tactile feedback device may improve the interactive touch experience in touch devices. When a user touches the touch screen, the controller of the tactile feedback device sends control signals to the driver based on the touch location information of the touch motion. After receiving the control signals, the driver may control the deformable units at the touch location to undergo deformation. Thus, feedback may be generated in response to the user's touch motion. Interactive touch experience may be improved.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A tactile feedback device, comprising: a deformable structure, a driver coupled to the deformable structure, a controller coupled to the driver, a first signal line, a second signal line, and a thin-film transistor coupled to a deformable unit, wherein:
the deformable structure is configured to include a plurality of deformable units placed on a display panel, each of the plurality of deformable units being capable of deforming along a direction at an angle to a plane the plurality of deformable units is placed on; the controller is configured to generate and send a control signal to the driver, the control signal being based on a touch location of a touch motion; and the driver is configured to drive deformable units corresponding to the touch location to deform based on the control signal;
the driver drives the deformable units corresponding to the touch location to deform along a direction perpendicular to the plane the plurality of deformable units is placed on;
each of the plurality of deformable units includes a first electrode, a second electrode, and a piece of electrostrictive material between the first electrode and the second electrode; and when the driver applies a voltage signal between the first electrode and the second electrode, the piece of electrostrictive material deforms in response to the voltage signal;
the first signal line is coupled to a source electrode of the first thin-film transistor, the second signal line is coupled to a gate electrode of the first thin-film transistor, the first electrode of the deformable unit is coupled to a drain electrode of the thin-film transistor, and the second electrode of a deformable unit is grounded; and when the second signal line coupled to the thin-film transistor is applied with a voltage scanning signal, and the first signal line coupled to the thin-film transistor is applied with a voltage driving signal, the deformable unit deforms.

2. The tactile feedback device according to claim 1, wherein the plurality of deformable units is arranged in an array.

3. The tactile feedback device according to claim 1, wherein: the driver includes a voltage driving module, a voltage scanning module, and a multiplexer; the voltage driving module is configured to generate the voltage driving signal; the voltage scanning module is configured to generate the voltage scanning signal; and base on the control signal, the multiplexer is configured to input the voltage scanning signal to the second signal line, and input the voltage driving signal to the corresponding first signal line, to drive the deformable unit to deform.

4. The tactile feedback device according to claim 3, wherein: the multiplexer includes a second thin-film transistor and a third thin-film transistor, the second thin-film transistor corresponding to the first signal line and the third thin-film transistor corresponding to the second signal line; a source electrode of the second thin-film transistor is coupled to an output terminal of the voltage driving module, and a drain electrode of the second thin-film transistor is coupled to the first signal line; and a source electrode of a third thin-film transistor is coupled to an output terminal of the voltage scanning module, and a drain electrode of the third thin-film transistor is coupled to the second signal line.

5. The tactile feedback device according to claim 3, wherein the voltage driving signal is an alternating current (AC) voltage signal.

6. The tactile feedback device according to claim 1, wherein: the piece of electrostrictive material includes piezoelectric ceramic.

7. A touch display device, incorporating the tactile feedback device according to claim 1.

8. The touch display panel according to claim 7, further comprising a touch screen and a display panel, wherein:
the touch screen is disposed at a side of the display panel that is used for displaying images; and
the tactile feedback device is disposed at a side of the touch screen that faces away from the display panel, the controller of the tactile feedback devices being configured to obtain touch location data from the touch screen.

9. A method for generating tactile feedback in response to a touch motion using a tactile feedback device, comprising:
obtaining, by a controller, a touch location of a touch motion;
sending, by the controller, a control signal to a driver of the tactile feedback device based on the touch location; and
applying, by the driver, a voltage signal on a deformable unit based on the control signal, the deformable unit deforming in response to the voltage signal, wherein
the driver drives the deformable unit corresponding to the touch location to deform along a direction perpendicular to the plane the deformable unit is placed on;
the deformable unit includes a first electrode, a second electrode, and a piece of electrostrictive material between the first electrode and the second electrode; and when the driver applies a voltage signal across the first electrode and the second electrode, the piece of electrostrictive material deforms in response to the voltage signal;
the tactile feedback device includes a first signal line, a second signal line, and a thin-film transistor coupled to a deformable unit;
the first signal line is coupled to a source electrode of the first thin-film transistor, the second signal line is coupled to a gate electrode of the first thin-film transistor, the first electrode of the deformable unit is coupled to a drain electrode of the thin-film transistor, and the second electrode of a deformable unit is grounded; and when the second signal line coupled to the thin-film transistor is applied with a voltage scanning signal, and the first signal line coupled to the thin-film transistor is applied with a voltage driving signal, the deformable unit deforms.

10. The method according to claim 9, wherein the voltage signal includes an alternating current (AC) voltage signal.

11. The method according to claim 9, wherein: the driver includes a voltage driving module, a voltage scanning module, and a multiplexer; the voltage driving module is configured to generate the voltage driving signal; the voltage scanning module is configured to generate the voltage scanning signal; and base on the control signal, the multiplexer is configured to input the voltage scanning signal to the second signal line, and input the voltage driving signal to the corresponding first signal line, to drive the deformable unit to deform.

12. The method according to claim 11, wherein: the multiplexer includes a second thin-film transistor and a third thin-film transistor, the second thin-film transistor corresponding to the first signal line and the third thin-film transistor corresponding to the second signal line; a source electrode of the second thin-film transistor is coupled to an output terminal of the voltage driving module, and a drain electrode of the second thin-film transistor is coupled to the first signal line; and a source electrode of a third thin-film transistor is coupled to an output terminal of the voltage scanning module, and a drain electrode of the third thin-film transistor is coupled to the second signal line.

13. The method according to claim 9, wherein: the piece of electrostrictive material includes piezoelectric ceramic.

* * * * *